(12) United States Patent
Yachida et al.

(10) Patent No.: US 11,279,298 B2
(45) Date of Patent: Mar. 22, 2022

(54) CAMERA MOUNTING STRUCTURE

(71) Applicant: TOYOTA JIDOSHA KABUSHIKI KAISHA, Toyota (JP)

(72) Inventors: Shosuke Yachida, Toyota (JP); Yusuke Takai, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 366 days.

(21) Appl. No.: 16/587,219

(22) Filed: Sep. 30, 2019

(65) Prior Publication Data

US 2020/0180521 A1 Jun. 11, 2020

(30) Foreign Application Priority Data

Dec. 10, 2018 (JP) .............................. JP2018-230577

(51) Int. Cl.
*B60R 11/04* (2006.01)
*B60R 11/00* (2006.01)

(52) U.S. Cl.
CPC ......... *B60R 11/04* (2013.01); *B60R 2011/001* (2013.01)

(58) Field of Classification Search
None
See application file for complete search history.

(56) References Cited

U.S. PATENT DOCUMENTS

| 2010/0260495 | A1* | 10/2010 | Usami | B60R 11/04 |
| | | | | 396/419 |
| 2019/0346126 | A1* | 11/2019 | Wada | H05K 7/20 |
| 2020/0155075 | A1* | 5/2020 | Takai | H04N 5/2257 |
| 2020/0180521 | A1* | 6/2020 | Yachida | B60R 11/04 |

FOREIGN PATENT DOCUMENTS

JP 2007-069680 A 3/2007

* cited by examiner

*Primary Examiner* — William B Perkey
(74) *Attorney, Agent, or Firm* — Sughrue Mion, PLLC

(57) ABSTRACT

An upper column cover includes a final positioning part, an initial positioning part, and a guide part. The final positioning part positions a camera in a state where the camera is arranged at a final assembly position at which a lens of the camera is arranged in an opening. The initial positioning part positions the camera in a state where the camera is arranged at an initial assembly position at which the lens of the camera is separated from a top wall portion and a suspended wall portion. The guide part guides the camera in a process in which the camera is moved from the initial assembly position to the final assembly position while regulating a movement of the lens of the camera in upward, downward, rightward, and leftward directions with respect to the upper column cover.

6 Claims, 13 Drawing Sheets

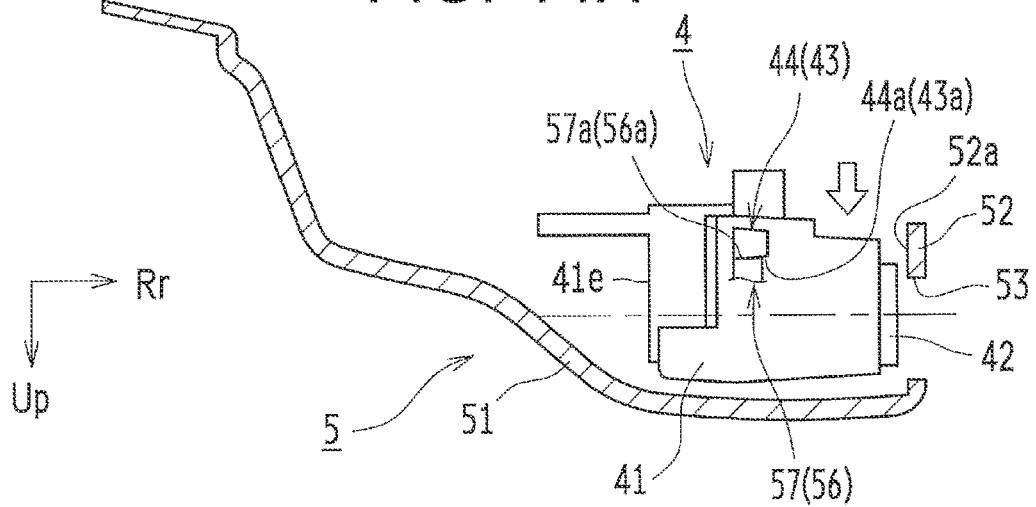
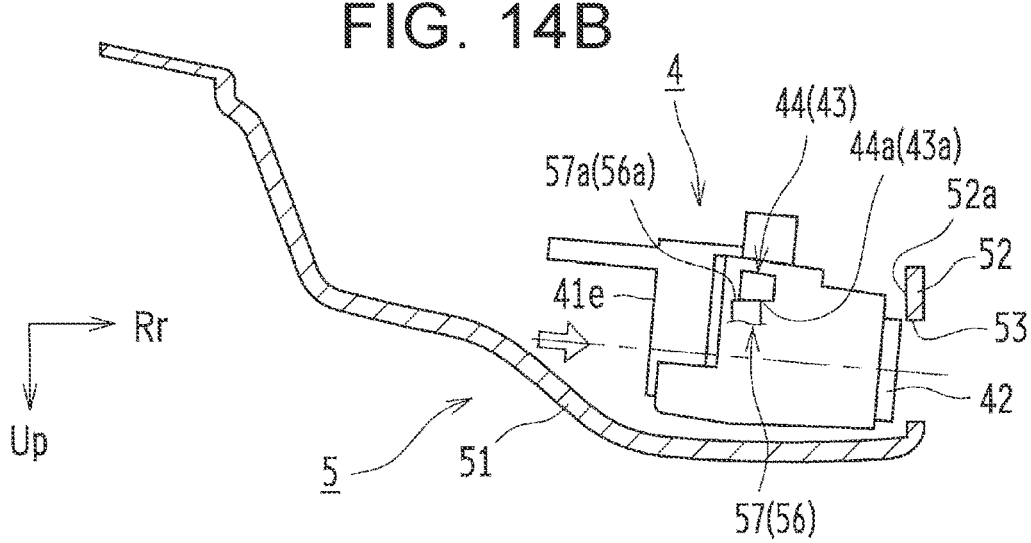
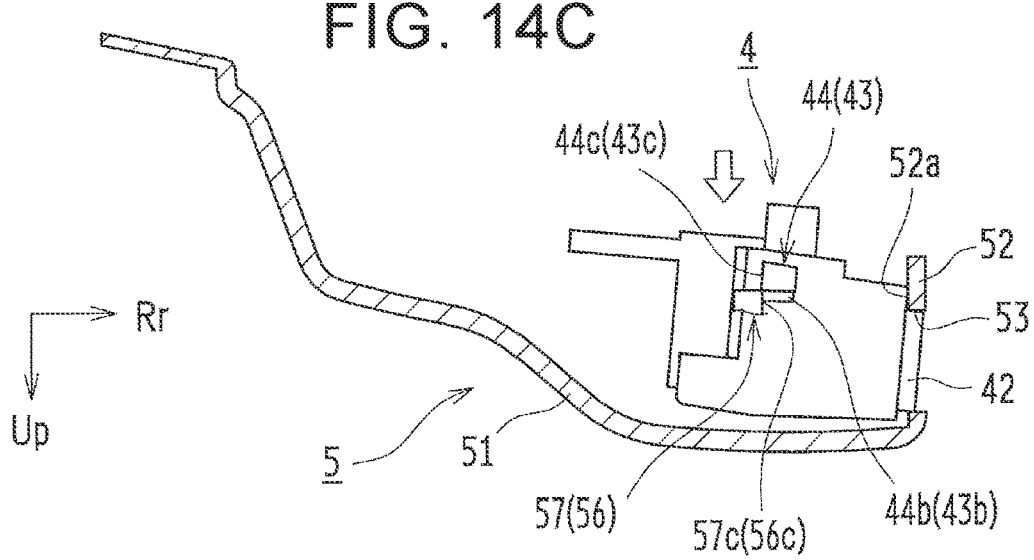

CAMERA MOUNTING STRUCTURE

INCORPORATION BY REFERENCE

The disclosure of Japanese Patent Application No. 2018-230577 filed on Dec. 10, 2018 including the specification, drawings and abstract is incorporated herein by reference in its entirety.

BACKGROUND

1. Technical Field

The present disclosure relates to a camera mounting structure in which a camera for monitoring a driver of a vehicle is assembled to an inside of a steering column.

2. Description of Related Art

For example, Japanese Unexamined Patent Application Publication No. 2007-69680 (JP 2007-69680 A) describes that a camera assembly in which a camera is housed in a case is arranged on an upper surface of a steering column.

SUMMARY

As described in JP 2007-69680 A, when the camera assembly is externally attached to the upper surface of the steering column, the number of components becomes large, and, since a raised portion is created in an upper part of the steering column, there is a concern that visibility of meters may be deteriorated.

Therefore, the inventors have been conducting earnest studies on assembling of a camera like the one described in JP 2007-69680 to an inside of a steering column.

In this case, a cover of the steering column can be substituted for a case of the camera assembly that is described in JP 2007-69680. Therefore, it can be said that the case can be omitted, and a size of the raised portion in the upper part of the steering column can be reduced.

However, when the camera is assembled to the steering column cover, it is necessary to take a measure in order to prevent a lens of the camera from coming into contact with an opening so that the lens does not get damaged. The opening is provided in the steering column cover in order to expose the lens of the camera. The inventors concluded that there is room for improvement here.

In light of this situation, an object of the present disclosure is to provide a camera mounting structure in which a camera can be assembled relatively easily to an inside of a steering column without a damage of the camera.

The present disclosure is a camera mounting structure in which a camera for monitoring a driver of a vehicle is assembled to an inside of a steering column. The camera mounting structure includes an upper column covert of the steering column. The upper column cover of the steering column includes a top wall portion, and a suspended wall portion that is provided on a rear side of the top wall portion in a front-rear direction of the upper column cover. The suspended wall portion is provided with an opening for exposing a lens of the camera to a side of a steering wheel. The upper column cover is provided with a final positioning part, an initial positioning part, and a guide part. The final positioning part is used to position the camera in a state where the camera is arranged at a final assembly position at which the lens is arranged in the opening. The initial positioning part is used to position the camera in a state where the camera is arranged at an initial assembly position at which the lens is separated from the top wall portion and the suspended wall portion. The guide part is used to guide the camera in a process in which the camera is moved from the initial assembly position to the final assembly position while the guide part is regulating a movement of the lens in upward, downward, rightward, and leftward directions with respect to the upper column cover.

With this configuration, since the camera is assembled to an inner side of the top wall portion of the upper column cover, the cover of the camera like the one described in JP 2007-69680 JP is not necessary. Thus, the number of components can be reduced, and a raised amount of the upper portion of the upper column cover is restrained. This contributes to an improvement of visibility of meters.

Further, with the foregoing configuration, the lens of the camera is arranged so as to be separated from the opening and the top wall portion of the upper column cover when the camera is arranged at the initial assembly position. Further, in the process in which the camera arranged at the initial assembly position is moved to the final assembly position, a movement of the lens of the camera in the upward, downward, rightward, and leftward directions is regulated.

Thus, in the process in which the camera is moved from the initial assembly position to the final assembly position, the lens interferes with neither the top wall portion nor the suspended wall portion of the upper column cover. Therefore, damage of the lens is avoided.

In the camera mounting structure, the initial positioning part may include a horizontal shake regulating surface, a separation regulating surface, and a height regulating surface. The horizontal shake regulating surface regulates a movement of the camera in a right-left direction of the upper column cover. The separation regulating surface regulates a movement of the camera in a front direction in the front-rear direction of the upper column cover. The height regulating surface regulates a separation position of the camera from an inner surface of the top wall portion.

With this configuration, since the initial positioning part includes the three regulating surfaces, a degree of design freedom is improved as, for example, locations of the three regulating surfaces can be selected more freely, in comparison to a case where the initial positioning part includes only one regulating element.

Further, in the camera mounting structure, a mounting piece may be provided in the camera on an opposite side from the lens. The mounting piece is used to fix the camera to the upper column cover in a state where the camera is arranged at the final assembly position. A screw receiving portion for fastening the mounting piece with a screw may be provided in the inner surface of the top wall portion. The horizontal shake regulating surface may be made of a flat surface that is provided in the screw receiving portion along the front-rear direction of the upper column cover and also receives an outer side surface of the camera on the opposite side of the lens, the outer side surface of the camera being provided along the front-rear direction of the upper column cover. The separation regulating surface may be made from a flat surface that is provided in the screw receiving portion along the right-left direction of the upper column cover and also receives a rear end surface of the camera on the opposite side of the lens, the rear end surface of the camera being provided along the right-left direction of the upper column cover.

Here, it is specified that the screw receiving portion plays a roles of fixing the camera and regulating a movement of the camera in the right-left direction and in the front direction (a movement to the opposite side of the steering wheel). Thus, it is not necessary to use a component such as a bracket in order to fix the camera to the upper column cover.

Further, in the camera mounting structure, ribs may be provided in the top wall portion and project downwardly in an upward-downward direction of the upper column cover. The ribs are provided at positions, respectively, that are separated from the suspended wall portion and located on outer sides of a first end side of the opening (a right side in the right-left direction of the upper column cover), and a second end side of the opening (a left side in the right-left direction of the upper column cover), respectively. Projecting portions that project outwardly may be provided on the right side (the right side in the right-left direction of the upper column cover) and the left side (the left side in the right-left direction of the upper column cover) of the camera, respectively. Projecting-side end surfaces of the ribs may serve as the height regulating surfaces that regulate the separation position of the camera from the inner surface of the top wall portion as given portions of the projecting portions are brought into contact with the projecting-side end surfaces of the ribs when the camera is arranged at the initial assembly position.

With this configuration, when the camera is arranged at the initial assembly position, the given portions of the projecting portions come into contact with the projecting-side end surfaces of the ribs, respectively. Thus, the camera is arranged at a position that is separated from the inner surface of the top wall portion at a given distance.

Further, in the camera mounting structure, the projecting-side end surfaces of the ribs may also serve as guide surfaces together with the right and left projecting portions of the camera that come into contact with the projecting-side end surfaces of the ribs, respectively. The guide surfaces guide the camera when the camera is moved from the initial assembly position to the final assembly position while regulating a movement of the camera to the right and the left.

With this configuration, an assembly operation can be carried out easily and swiftly because, for example, the camera can be moved stably so that the camera does not move in a lateral direction (the right-left direction of the upper column cover) when the camera is moved from the initial assembly position to the final assembly position.

Further, in the camera mounting structure, a lens cover may be provided on an outer side of the lens of the camera so as to cover the lens, and the lens cover may be fitted into the opening in a non-contact state when the camera is arranged at the final assembly position.

Here, a configuration is specified in which the camera is in an optimum state when the camera is arranged at the final assembly position.

According to the present disclosure, it is possible to provide the camera mounting structure in which the camera can be assembled to an inside of the steering column relatively easily without a damage of the camera.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 14A is a view corresponding to FIG. 11 and shows an initial stage of arranging the camera at the initial assembly position;

FIG. 14B is a view corresponding to FIG. 11 and shows an intermediate stage of arranging the camera at the initial assembly position;

FIG. 14C is a view corresponding to FIG. 11 and shows a final stage of arranging the camera at the initial assembly position.

DETAILED DESCRIPTION OF EMBODIMENTS

Figure 1:
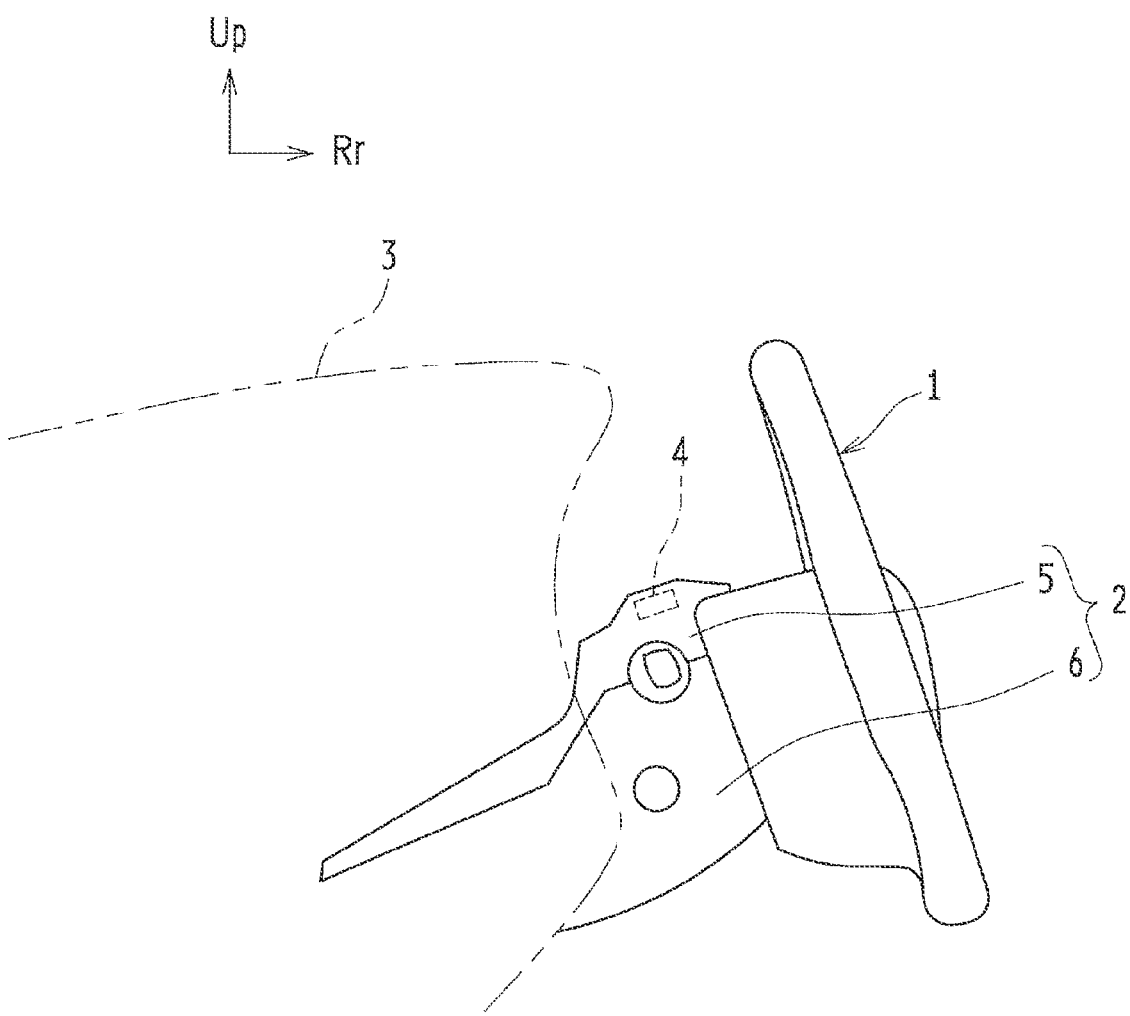
FIG. 1 is a side view of an embodiment of a camera mounting structure according to the present disclosure.

Hereinafter, an ideal embodiment for carrying out the present disclosure is described in detail with reference to the drawings.

FIG. 1 to FIG. 15 show the embodiment of the present disclosure. In the drawings, a reference numeral 1 represents a steering wheel, a reference numeral 2 represents a steering column, a reference numeral 3 represents a dashboard, and a reference numeral 4 represents a camera.

Also, Up represents a vehicle upper side, Rr represents a vehicle rear side, Lh represents a vehicle left side, and Rh represents a vehicle right side.

The camera 4 is mounted in a form that the camera 4 is assembled to an inside of the steering column 2 so that the camera 4 is able to photograph the face of a driver of a vehicle without inhibiting visibility of various meters (not shown) in the dashboard 3.

Hereinafter, a mounting structure of the camera 4 is described in detail.

As shown in FIG. 1, the steering column 2 has a structure in which an upper column cover 5 and a lower column cover 6 are combined with each other.

Figure 9:
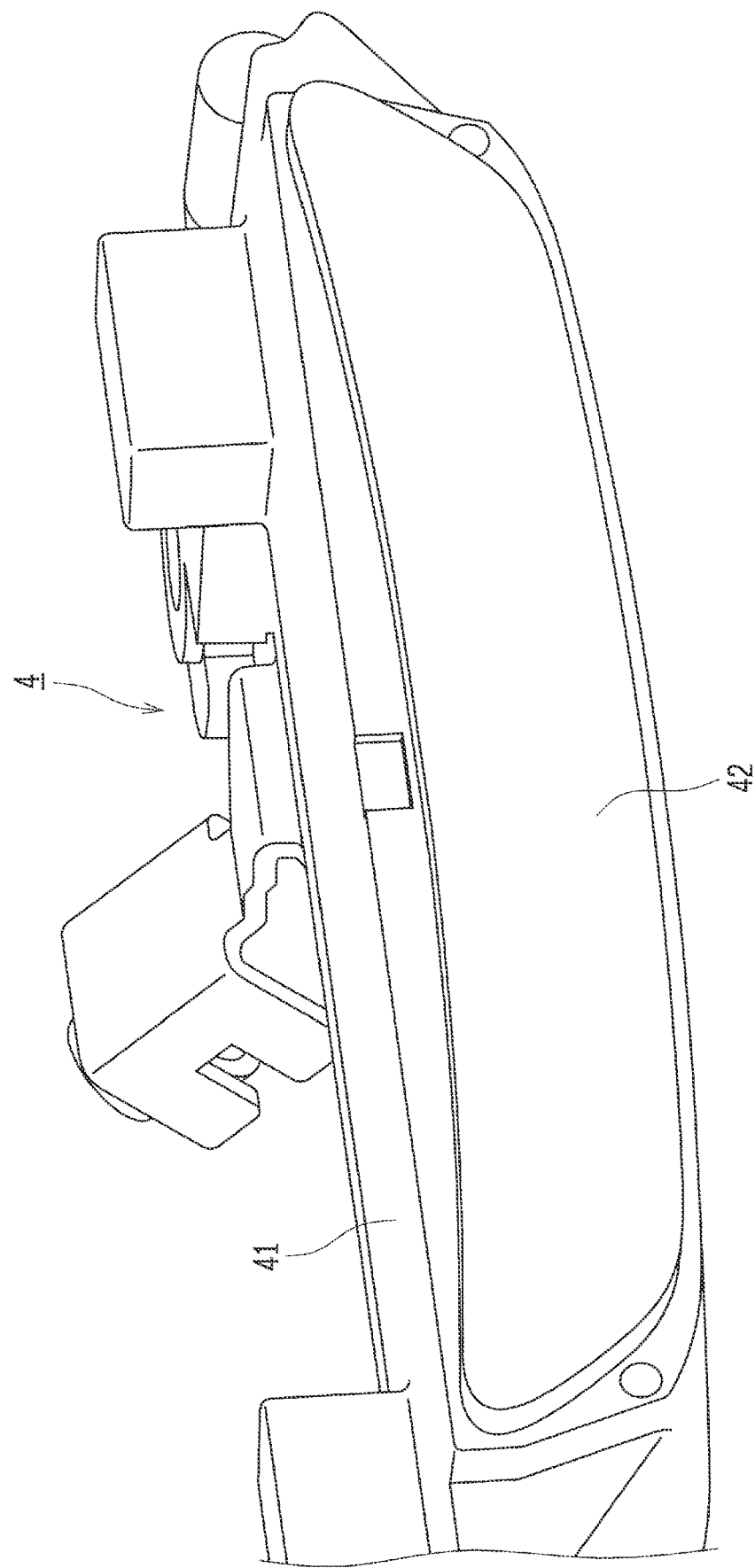
FIG. 9 is a perspective view showing the camera only, the camera being shown upside down and seen from a side of a lens cover.

An outside surface of the camera 4 except a region of a lens (not shown) is protected by being covered with a frame 41 that is made from, for example, synthetic resin. Also, as shown in FIG. 9, the lens is protected by a transparent lens cover 42 as the lens is covered with the lens cover 42.

The lens is not shown because illustration of the lens is difficult as the lens is covered with the lens cover 42 as described above, and it is thus hard to see the lens. This means that, although the lens is not shown, the lens is arranged behind the lens cover 42.

With respect to the camera 4, a side where the lens cover 42 is arranged is referred to as a "front" side, and an opposite side of the lens cover 42 from the "front" side is referred to as a "rear" side.

Figure 2:
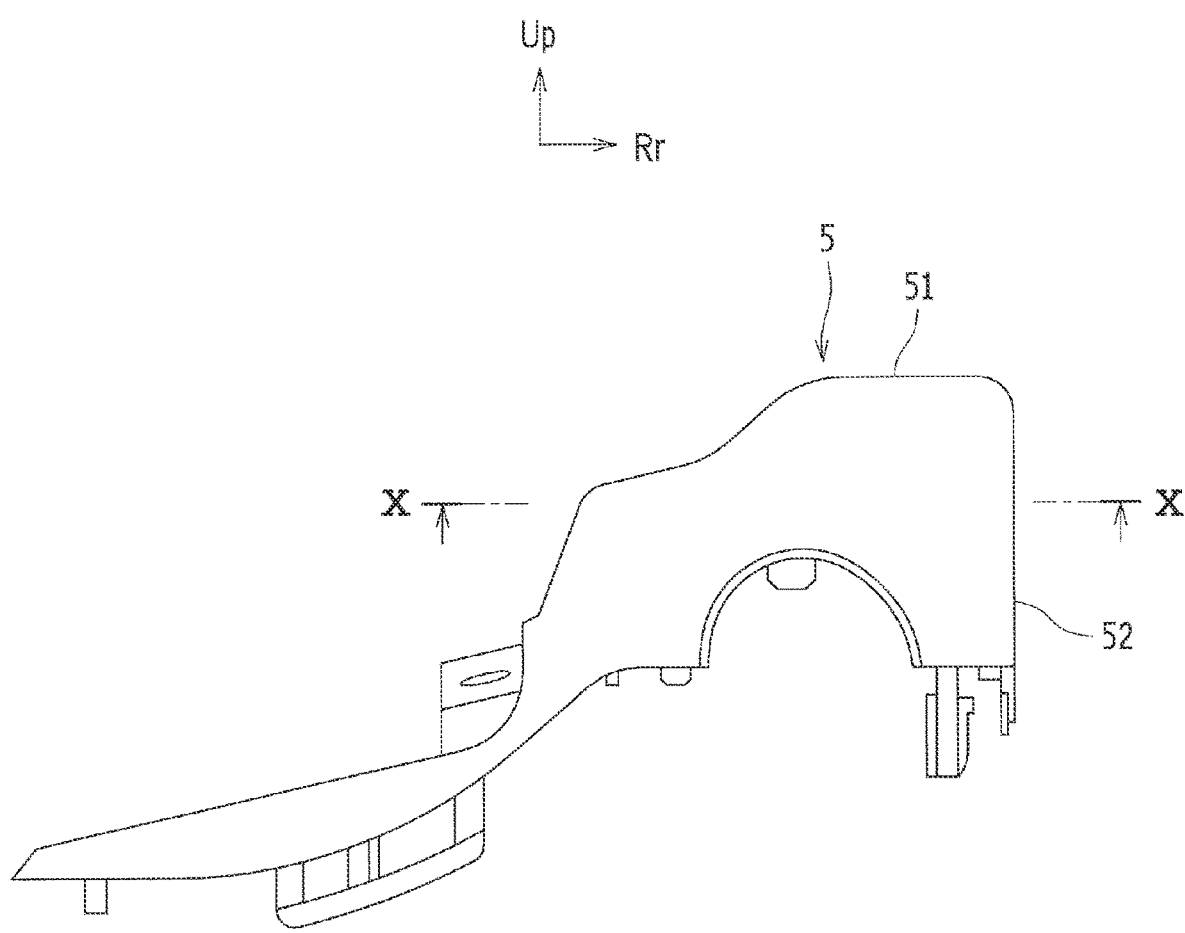
FIG. 2 is a side view showing only an upper column cover of a steering column.

As shown in FIG. 2, the upper column cover 5 includes a top wall portion 51 and a suspended wall portion 52.

The upper column cover 5 is formed into a long shape along a steering shaft (not shown), and a direction along the steering shaft is generally referred to as a front-rear direction. Because of this, with respect to the upper column cover 5, a side on which the suspended wall portion 52 is arranged is referred to as a "rear" side.

Figure 4:
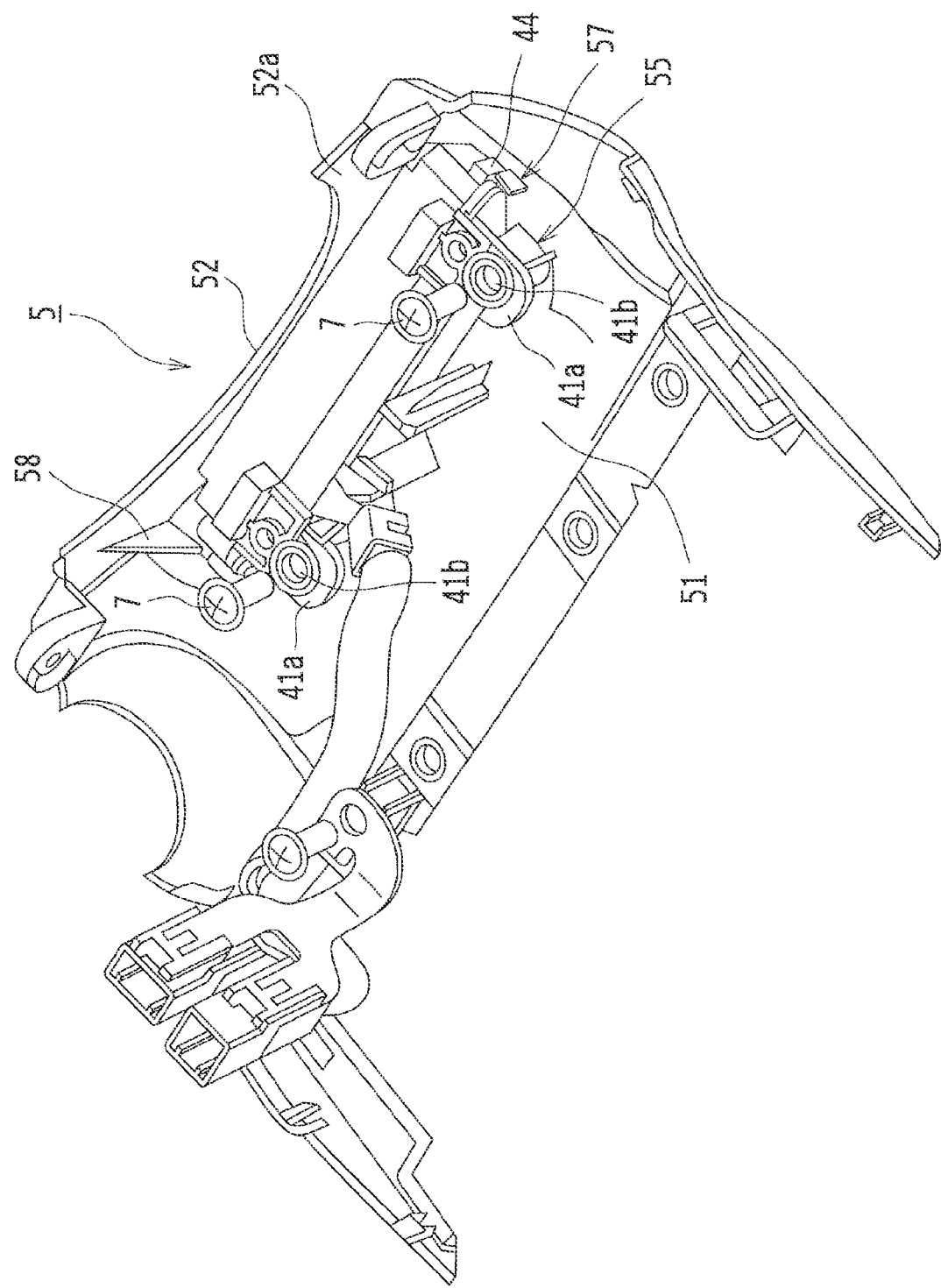
FIG. 4 is a perspective view of the upper column cover to which the camera is assembled, the upper column cover being shown upside down.
Figure 5:
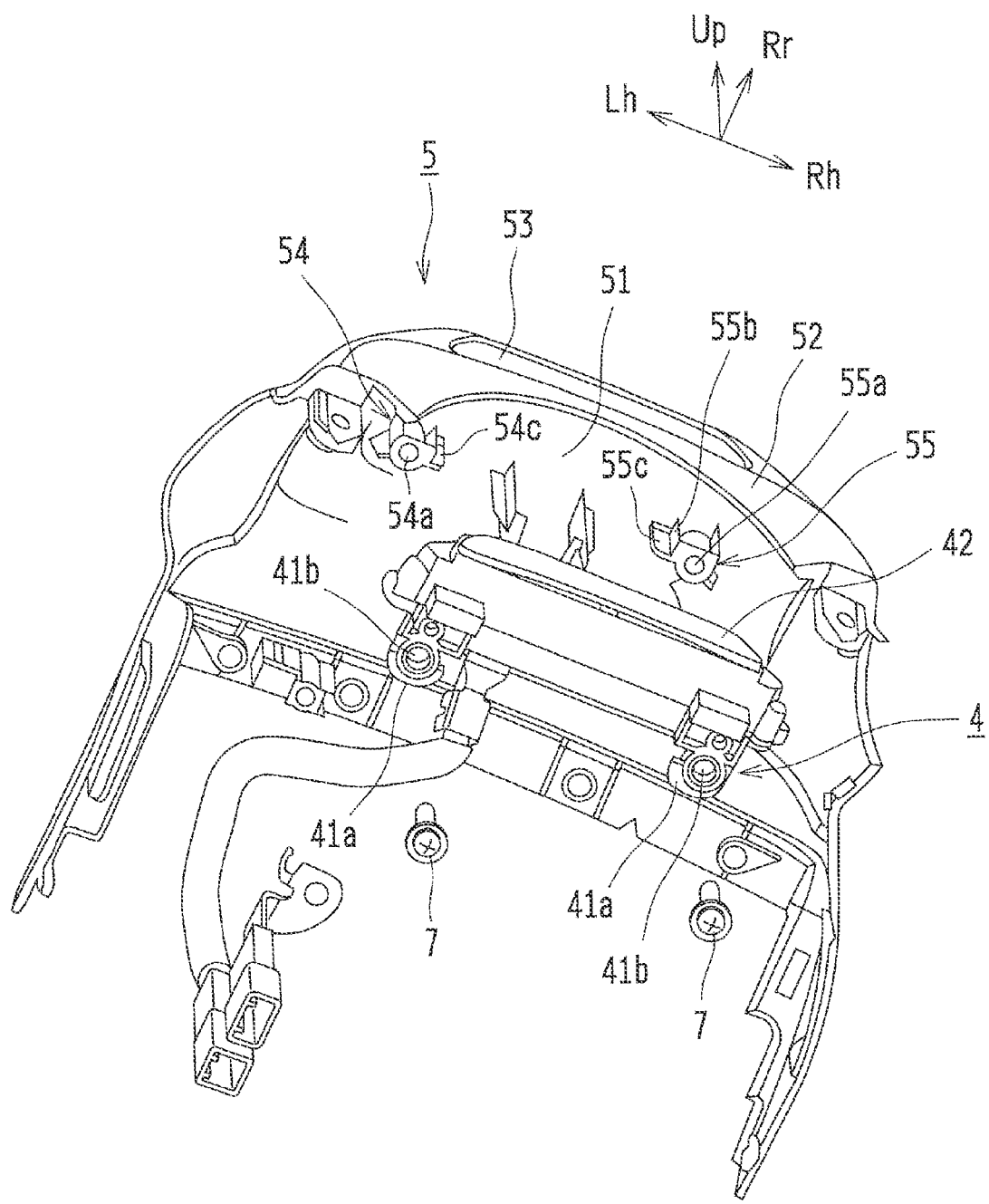
FIG. 5 is a perspective bottom view of the upper column cover, showing a state before the camera is assembled to the upper column cover.
Figure 6:
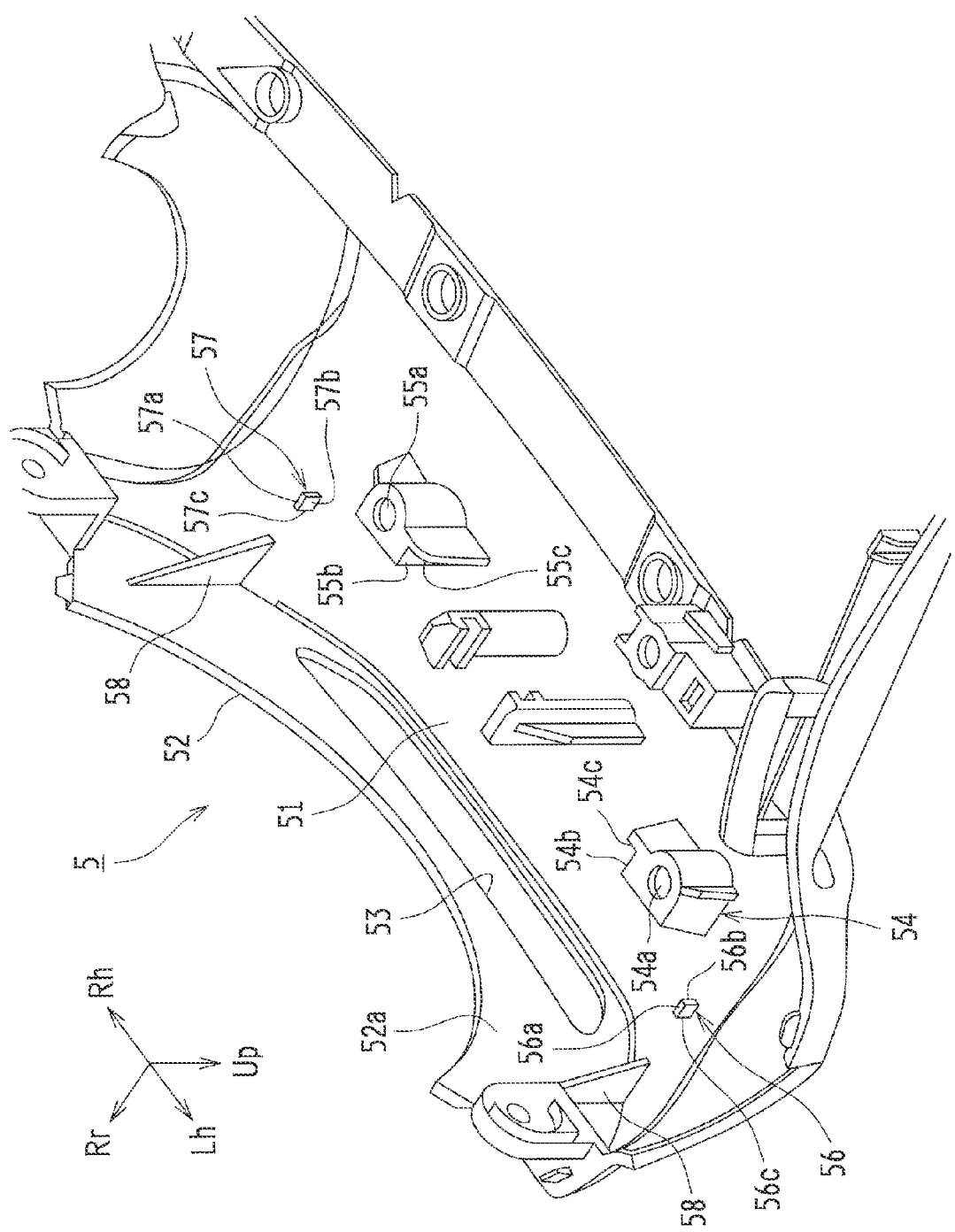
FIG. 6 is a perspective view showing the upper column cover only, the upper column cover being shown upside down.
Figure 7:
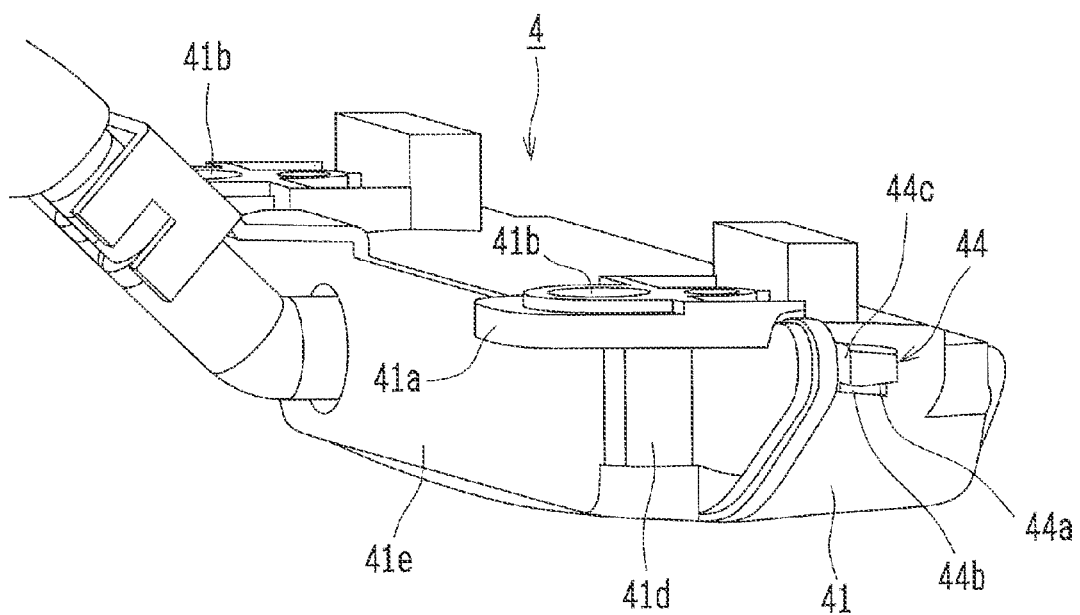
FIG. 7 is a perspective view showing the camera only, the camera being shown upside down.

In a connecting portion between the top wall portion 51 and the suspended wall portion 52, reinforcing wall portions 58 are provided in order to reinforce the top wall portion 51 and the suspended wall portion 52. As shown in FIG. 4 and FIG. 6, each of the reinforcing wall portions 58 is formed into a plate shape having an almost triangle shape in a side view.

In the suspended wall portion 52, an opening 53 is provided in order to expose the lens cover 42 towards the steering 1, the lens cover 42 covering the lens (not shown) of the camera 4. The opening 53 is formed into, for example, a rectangular shape that is long from side to side.

The camera 4 is fixed by screws 7 described later in a state where the camera 4 is assembled to a given position on an inner side of the top wall portion 51 of the upper column cover 5.

In the upper column cover 5, a final positioning part (a reference numeral of which is omitted) is provided in order to position the camera 4 in a state where the camera 4 is arranged at a final assembly position.

Figure 10:
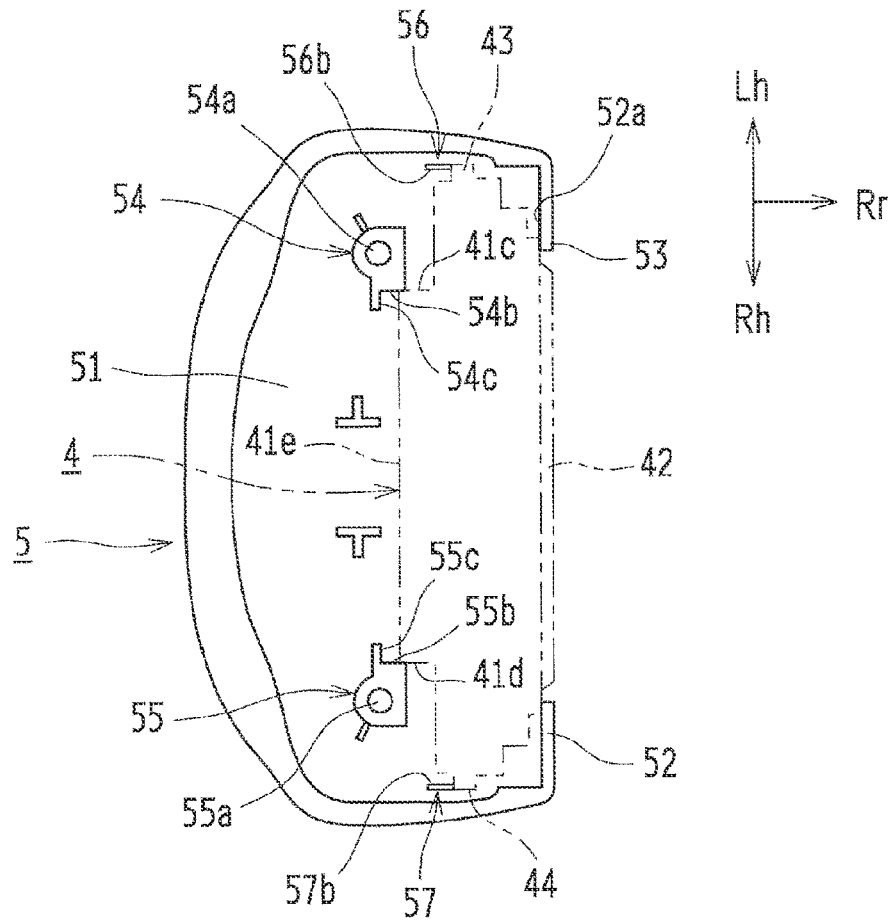
FIG. 10 is a view of a section taken along the lines X-X in FIG. 2 seen from a direction of arrows, the view showing a state where the camera is arranged at a final assembly position.
Figure 11:
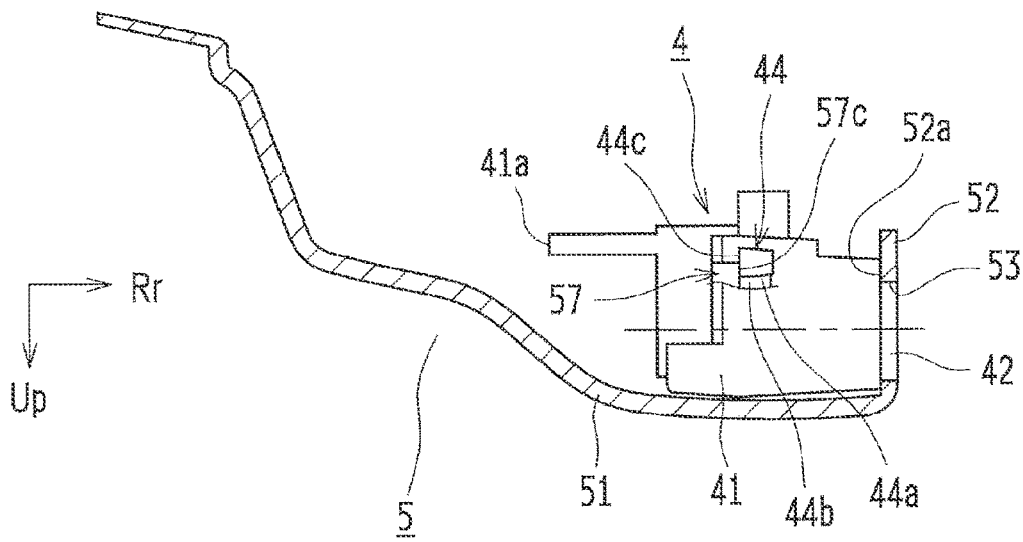
FIG. 11 is a view of a section taken along the lines XI-XI in FIG. 3 seen from a direction of arrows, the view showing the state where the camera is arranged at the final assembly position.
Figure 12:
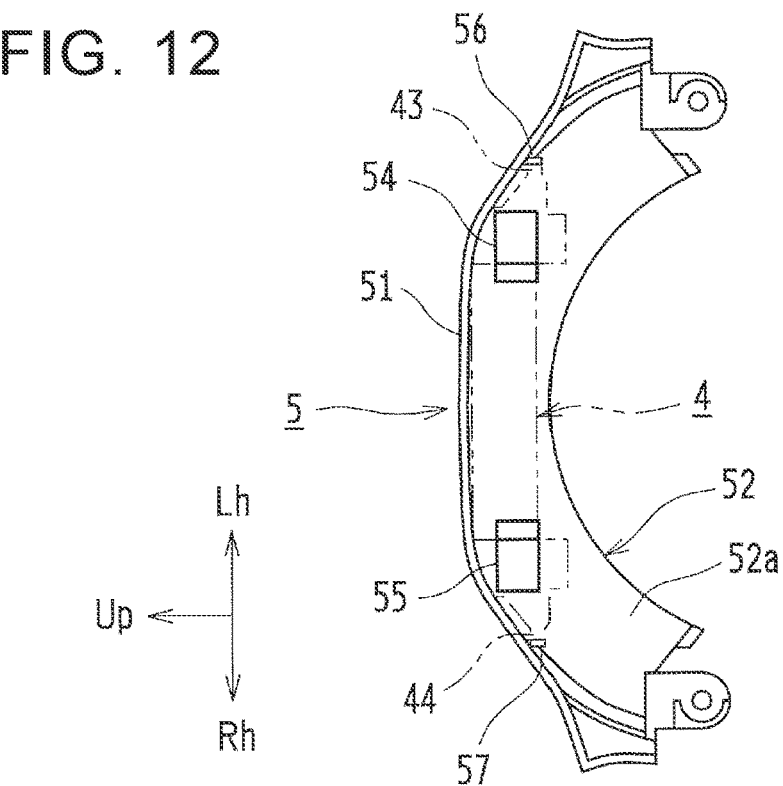
FIG. 12 is a view of a section taken along the lines XII-XII in FIG. 3 seen from a direction of arrows, the view showing the state where the camera is arranged at the final assembly position.

As shown in FIG. 10, FIG. 11, and FIG. 12, the final assembly position means a position at which the camera 4 is fixed in a state where the lens cover 42 of the camera 4 is fitted into the opening 53 of the upper column cover 5 in a non-contact state.

Further, the final positioning part includes right and left ribs 57, 56 provided at given positions, respectively, on the inner side of the top wall portion 51, and an inner surface 52a of the suspended wall portion 52.

Figure 3:
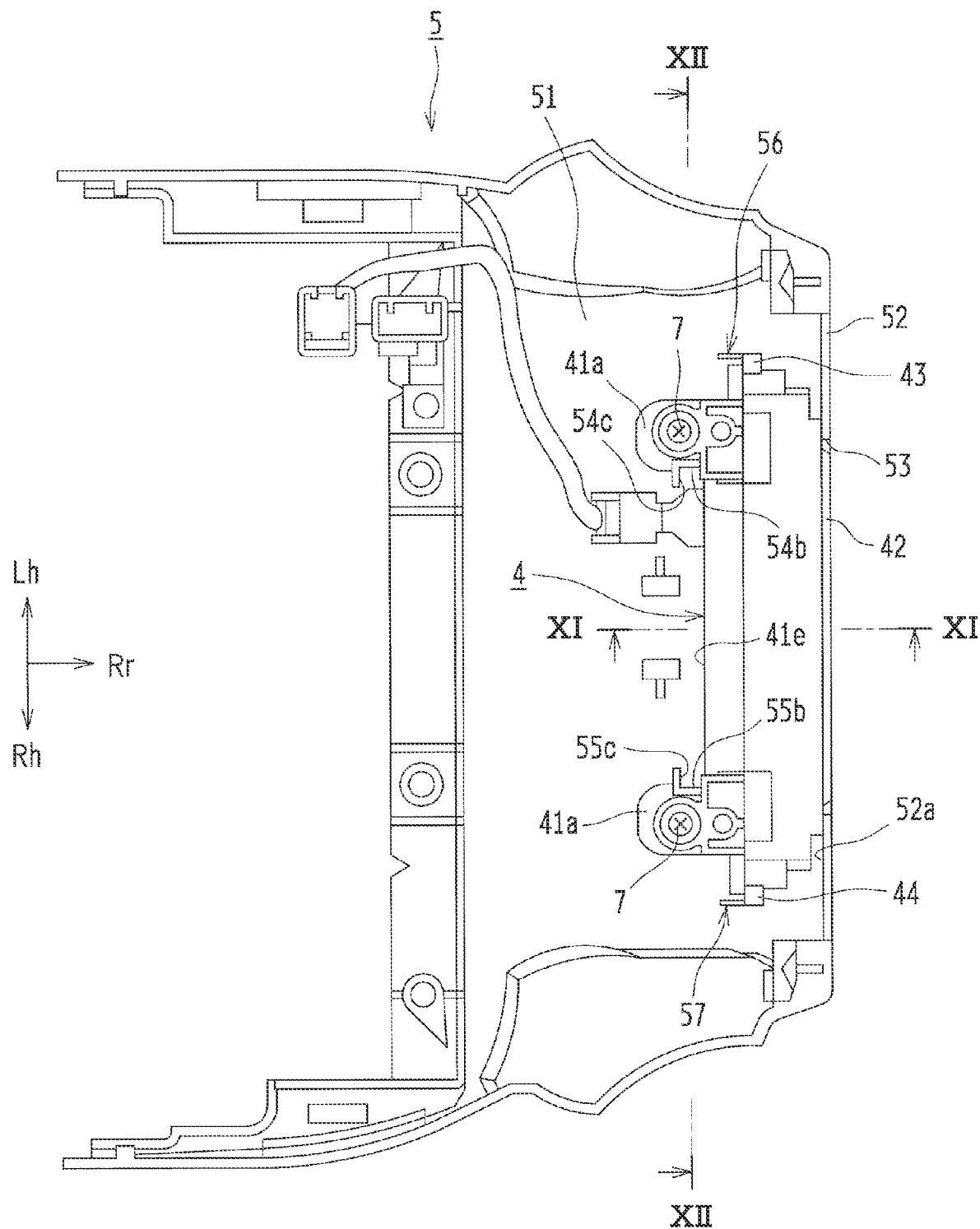
FIG. 3 is a plan view of the upper column cover to which a camera is assembled, the upper column cover being shown upside down.

As shown in FIG. 3 and FIG. 6, each of the right and left ribs 57, 56 is made of a relatively small rectangular plate piece. The ribs 57, 56 are provided at the given positions, respectively, that are separated from the suspended wall portion 52 so that the ribs 57, 56 project downwardly from the top wall portion 51 in an upward-downward direction of the upper column cover 5. The given positions are located in the top wall portion 51 on outer sides of a first end side of the opening 53 in the longitudinal direction (the right side of the upper column cover 5 in the right-left direction) and a second end side of the opening 53 in the longitudinal direction (the left side of the upper column cover 5 in the right-left direction), respectively. The right and left ribs 57, 56 are arranged so that wide inner side surfaces 57b, 56b and outer side surfaces (reference numerals of which are omitted) of the two ribs 57, 56 are located along the vehicle front-rear direction.

Then, as shown in FIG. 10, FIG. 11, and FIG. 12, when the camera 4 is arranged at the final assembly position, rear end surfaces 44c, 43c of right and left projecting portions 44, 43 of the camera 4 come into contact with rear end surfaces 57c, 56c of the right and left ribs 57, 56, respectively. At the same time, an outer peripheral region of the lens cover 42 on a front end surface of the frame 41 of the camera 4 comes into contact with the inner surface 52a of the suspended wall portion 52. Thus, the lens cover 42 of the camera 4 is positioned in an immobile manner in a state where the lens cover 42 is fitted into the opening 53 of the suspended wall portion 52 in the non-contact state. In other words, the final positioning part sandwiches the camera 4 from the front and rear sides of the camera 4 so that the camera 4 is not able to move.

Further, the upper column cover 5 is provided with an initial positioning part (a reference numeral of which is omitted) for positioning the camera 4 in the state where the camera 4 is arranged at the initial assembly position.

Figure 13:
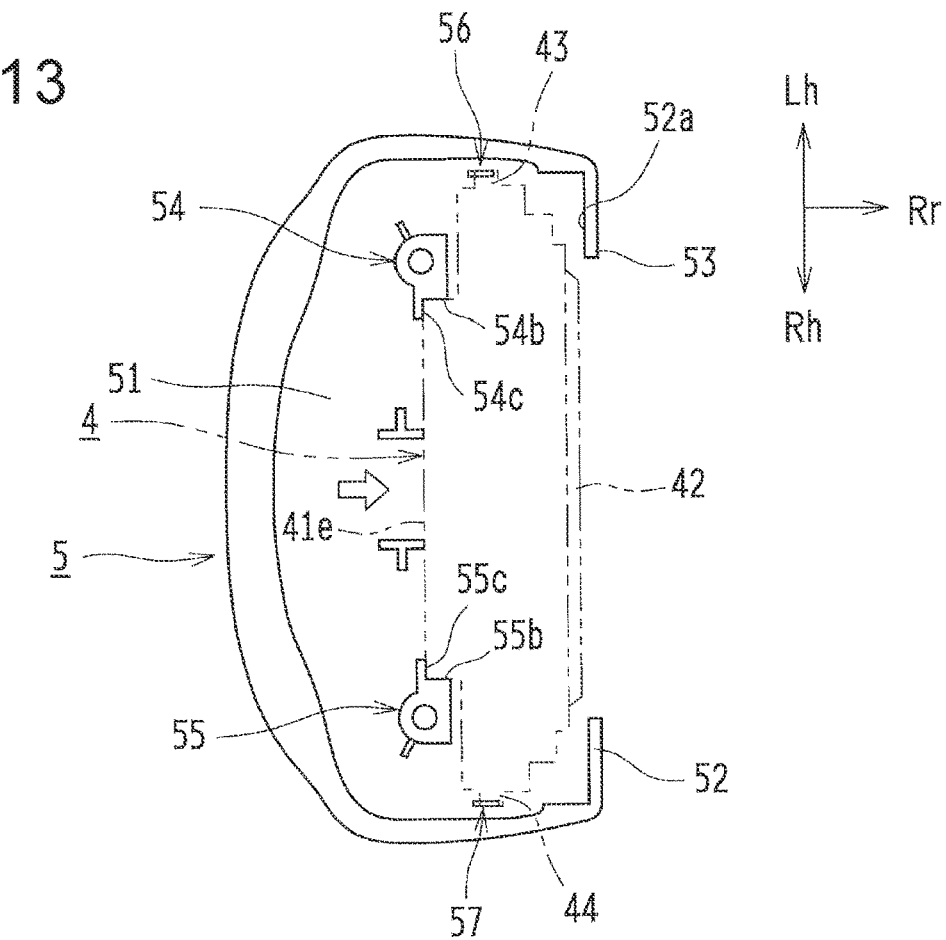
FIG. 13 is a view corresponding to FIG. 10 and shows a state where the camera is arranged at an initial assembly position.
Figure 15:
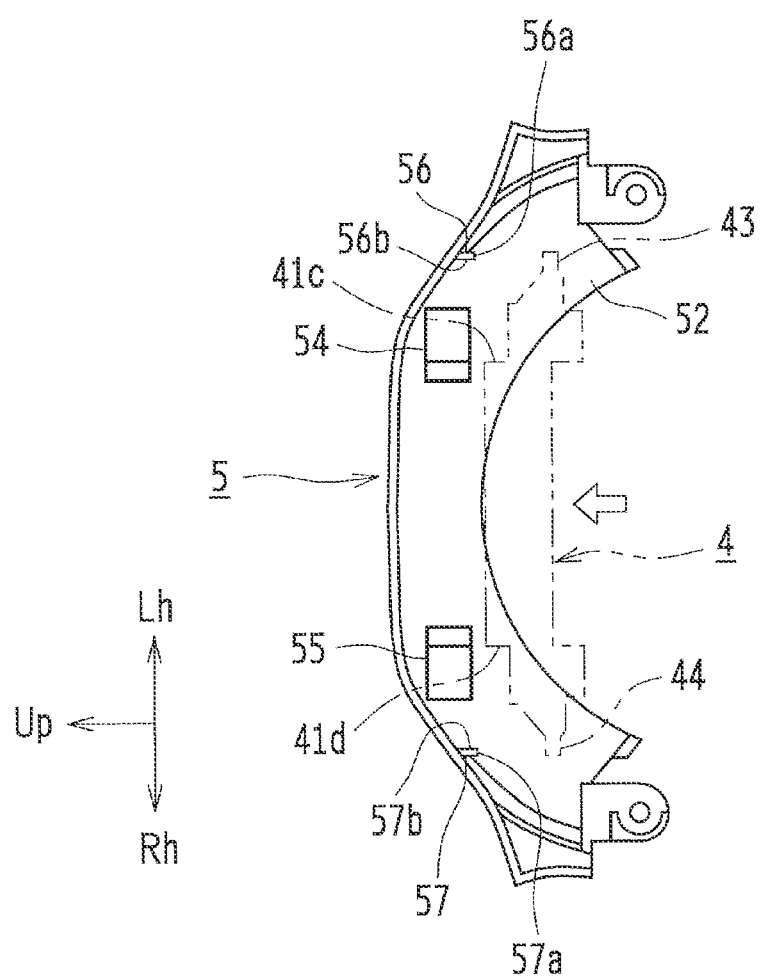
FIG. 15 is a view corresponding to FIG. 12 and shows a state before the camera is arranged at the initial assembly position.

As shown in FIG. 13, FIG. 14A, and FIG. 15, the initial assembly position is a position where the lens (not shown) and the lens cover 42 of the camera 4 are arranged so as to be separated from the inner surface 52a of the suspended wall portion 52 and an inner surface of the top wall portion 51 of the upper column cover 5.

Further, the initial positioning part includes horizontal shake regulating surfaces 55b, 54b, separation regulating surfaces 55c, 54c, and height regulating surfaces (projecting-side end surfaces 57a, 56a stated below).

The horizontal shake regulating surfaces 55b, 54b play a role of regulating a movement of the camera 4 in a lateral direction (a right-left direction of the upper column cover 5) at an initial stage of assembly of the camera 4, and also play a role of linearly guiding the camera 4 when the camera 4 is moved from the initial assembly position to the final assembly position.

The separation regulating surfaces 55c, 54c play a role of regulating a movement of the camera 4 in a direction in which the camera 4 is separated from the suspended wall portion 52, in other words, in the front direction in the front-rear direction of the upper column cover 5, at the initial stage of assembly of the camera 4. This kind of movement of the camera 4 can also be referred to as a "retreat".

The height regulating surfaces (the projecting-side end surfaces 57a, 56a stated below) play a role of regulating a separation position (a height position) of the camera 4 from the top wall portion 51 by regulating a movement of the camera 4 in a direction in which the camera 4 is moved towards the top wall portion 51, in other words, in an upward direction of the camera 4 (an upward direction in an upward-downward direction of the upper column cover 5) at the initial stage of assembly of the camera 4.

Specifically, the horizontal shake regulating surfaces 55b, 54b and the separation regulating surfaces 55c, 54c are formed in right and left screw receiving portions 55, 54, respectively. The screw receiving portions 55, 54 are provided on the inner side of the top wall portion 51 of the upper column cover 5.

The right and left screw receiving portions 55, 54 are formed into a column shape, and are provided with screw holes 55a, 54a, respectively. The screws 7 described above for fixing the camera are screwed into the screw holes 55a, 54a, respectively.

Mounting pieces 41a are provided at positions corresponding to the right and left screw receiving portions 55, 54, respectively, in the frame 41 of the camera 4. Each of the mounting pieces 41a is provided with a screw insertion hole 41b into which the screw 7 for fixing the camera is inserted.

This means that the camera 4 is fixed to the upper column cover 5 as the mounting pieces 41a of the camera 4 are mounted on end surfaces of the right and left screw receiving portions 55, 54 on a projecting side, respectively, and the screws 7 are screwed into the screw holes 55a, 54a of the right and left screw receiving portions 55, 54 from the screw insertion holes 41b of the mounting pieces 41a, respectively.

The horizontal shake regulating surfaces 55b, 54b are made of flat surfaces that are located along the front-rear direction of the upper column cover 5 (same as the vehicle front-rear direction), and the separation regulating surfaces 55c, 54c are made of flat surfaces that are located along the right-left direction of the upper column cover 5 (same as the vehicle right-left direction). The horizontal shake regulating surfaces 55b, 54b and the separation regulating surfaces 55c, 54c are formed in the right and left screw receiving portions 55, 54, respectively, in a form that the horizontal shake regulating surfaces 55b, 54b and the separation regulating surfaces 55c, 54c are orthogonal to each other in an L-shape, respectively, and thus forming depressions, respectively.

Then, when the camera 4 is arranged at the initial assembly position, the right and left horizontal shake regulating surfaces 55b, 54b receive right and left outer side surfaces 41d, 41c of the camera 4, respectively. Meanwhile, the right and left separation regulating surfaces 55c, 54c receive the right and left sides of the rear end surface 41e of the camera 4, respectively.

The right and left outer side surfaces 41d, 41c are provided along the front-rear direction of the camera 4, and the rear end surface 41e is provided along the right-left direction of the camera 4. The right and left outer side surfaces 41d, 41c and the rear end surface 41e are orthogonal to each other in an L-shape, respectively, thereby forming right and left corner portions in a rear end of the frame 41 of the camera 4, respectively.

Also, the height regulating surfaces (the projecting-side end surfaces 57a, 56a) are formed in the right and left ribs 57, 56, respectively. The right and left ribs 57, 56 are provided at the given positions on the inner side of the top wall portion 51 of the upper column cover 5.

As shown in FIG. 6, the right and left ribs 57, 56 are made of relatively small rectangular plate pieces, respectively, and provided at positions, respectively, that are separated from the suspended wall portion 52 so that the ribs 57, 56 project downwardly from the top wall portion 51 in the upward-downward direction of the upper column cover 5. The positions are located in the top wall portion 51 on outer sides of the first end side of the opening 53 in the longitudinal direction (the right side of the upper column cover 5 in the right-left direction), and the second end side of the opening 53 in the longitudinal direction (the left side of the upper column cover 5 in the right-left direction), respectively. The right and left ribs 57, 56 are arranged so that wide inner side surfaces 57b, 56b and the outer side surfaces (reference numerals of which are omitted) of the two ribs 57, 56 are located along the front-rear direction of the upper column cover 5.

As shown in FIG. 14A, when the camera 4 is arranged at the initial assembly position, given portions (upward surfaces 44a, 43a) of the projecting portions 44, 43 of the camera 4 are brought into contact with the projecting-side end surfaces 57a, 56a of the right and left ribs 57, 56, respectively. Thus, the separation position (the height position) of the camera 4 from the inner surface of the top wall portion 51 is regulated.

As described below, in this embodiment, the projecting-side end surfaces 57a, 56a of the right and left ribs 57, 56 not only perform the foregoing regulation, but also serve as guide surfaces that linearly guide the camera 4 in a stable state so that the camera 4 does not shake horizontally when the camera 4 is moved from the initial assembly position to the final assembly position.

Further, the projecting portions 44, 43 are provided on the right side (the right side of the upper column cover 5 in the right-left direction) and the left side (the left side of the upper column cover 5 in the right-left direction) of the frame 41 of the camera 4, respectively. The projecting portions 44, 43 project outwardly.

Figure 8:
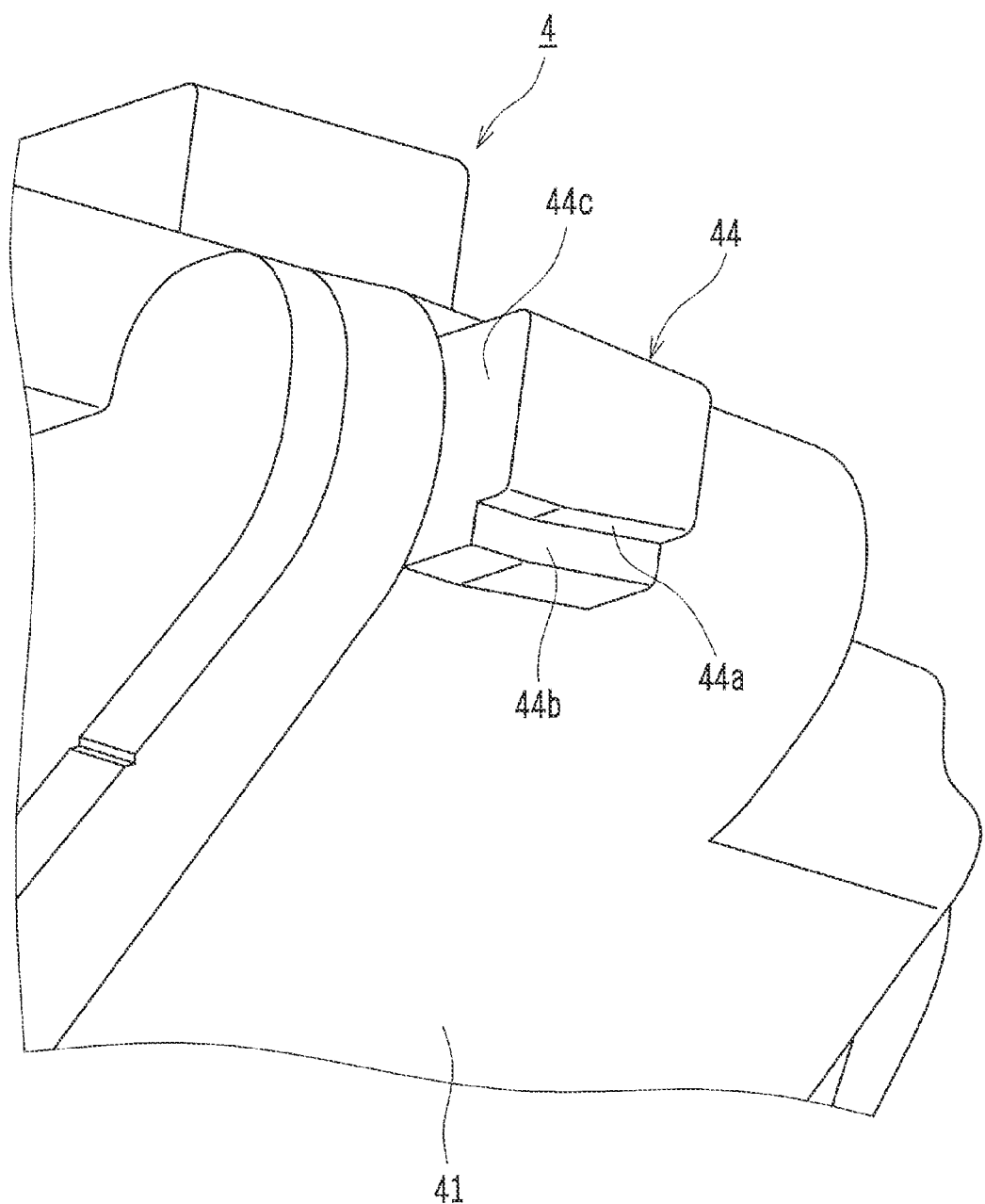
FIG. 8 is an enlarged perspective view of a right side of a frame of the camera in FIG. 7.

As shown in FIG. 8, the right and left projecting portions 44, 43 are formed into a shape like a rectangular parallelepiped. The upward surfaces 44a, 43a and outward surfaces 44b, 43b are provided in upper corner portions of the right and left projecting portions 44, 43, respectively.

The upward surfaces 44a, 43a and the outward surfaces 44b, 43b are formed along the front-rear direction of the camera 4, and are orthogonal to each other, thereby forming depressions, respectively.

The upward surfaces 44a, 43a come into contact with the projecting-side end surfaces (the height regulating surfaces) 57a, 56a of the right and left ribs 57, 56 of the upper column cover 5, respectively, when the camera 4 is assembled to the initial assembly position.

The outward surfaces 44b, 43b come into contact with the inner side surfaces 57b, 56b of the right and left ribs 57, 56 of the upper column cover 5, respectively, when the camera 4 is assembled to the initial assembly position.

As shown in FIG. 8, each of the upward surfaces 44a, 43a includes a horizontal region (a reference numeral of which is omitted) and an inclined region (a reference numeral of which is omitted).

The horizontal region is parallel to a center line of the lens cover 42 of the camera 4 (a straight line passing through the center of the lens cover 42 in the front-rear direction of the camera 4; see the dashed line in FIG. 11). The inclined region is inclined so as to slope down towards the front side with respect to the center line at a given angle.

The inclined region is provided so that the camera 4 is tilted as shown in FIG. 14B and FIG. 14C when the camera 4 is moved from the initial assembly position to the final assembly position. Thus, the lens cover 42 of the camera 4 is easily fitted into the opening 53 of the upper column cover 5 without interference with the opening 53.

Next, steps of assembling the camera 4 to the upper column cover 5 are described.

Here, the upper column cover 5 is first turned upside down, and then the camera 4 is assembled to the inner surface of the top wall portion 51 of the upper column cover 5.

First of all, as shown in FIG. 13, FIG. 14A, and FIG. 15, the L-shaped corner portions are matched with L-shaped depressed portions so that the L-shaped corner portions are fitted into the L-shaped depressed portions, respectively. The L-shaped corner portions are made of the right and left outer side surfaces 41d, 41c and the right side and the left side of the rear end surface 41e of the frame 41 of the camera 4, respectively. The L-shaped depressed portions are made of the horizontal shake regulating surfaces 55b, 54b and the separation regulating surfaces 55c, 54c of the right and left screw receiving portions 55, 54 provided in the top wall portion 51 of the upper column cover 5, respectively.

Specifically, the camera 4 is brought closer to the top wall portion 51 of the upper column cover 5 and then the right and left outer side surfaces 41d, 41c of the camera 4 are brought into contact with the horizontal shake regulating surfaces 55b, 54b of the right and left screw receiving portions 55, 54, respectively. At the same time, the right side and the left side of the rear end surface 41e of the camera 4 are brought into contact with the separation regulating surfaces 55c, 54c of the right and left screw receiving portions 55, 54, respectively. Further, the horizontal regions of the upward surfaces 44a, 43a of the right and left projecting portions 44, 43 of the camera 4 are brought into contact with the projecting-side end surfaces (the height regulating surfaces) 57a, 56a of the right and left ribs 57, 56 of the upper column cover 5, respectively.

Thus, as shown in FIG. 14A, the center line of the camera 4 (see the dashed line) becomes parallel to the top wall portion 51. At this stage, the lens cover 42 of the camera 4 interferes with neither the top wall portion 51 nor the suspended wall portion 52 of the upper column cover 5.

A position at which the camera 4 is assembled to the top wall portion 51 of the upper column cover 5 as described above is the initial assembly position described above.

Next, in FIG. 14A, a lower surface of the camera 4 on a side of the lens cover 42 is pushed towards the top wall portion 51 as shown by the arrow in FIG. 14A.

Thus, the inclined regions of the upward surfaces 44a, 43a of the right and left projecting portions 44, 43 of the camera 4 come into contact with the projecting-side end surfaces (the height regulating surfaces) 57a, 56a of the right and left ribs 57, 56 of the upper column cover 5, respectively. Thus, the camera 4 is tilted as shown in FIG. 14B.

The camera 4 tilted as described above is pushed towards the suspended wall portion 52 as shown by the arrow in FIG. 14B.

Therefore, the inclined regions of the upward surfaces 44a, 43a of the right and left projecting portions 44, 43 are guided in a sliding manner by the projecting-side end surfaces (the height regulating surfaces) 57a, 56a of the right and left ribs 57, 56, respectively, and the right and left outer side surfaces 41d, 41c of the frame 41 of the camera 4 are guided in a sliding manner by the right and left horizontal shake regulating surfaces 55b, 54b, respectively. Thus, the camera 4 is moved linearly without a horizontal shake. Then, as shown in FIG. 14C, the lens cover 42 of the camera 4 is fitted into the opening 53 of the upper column cover 5 in the non-contact state. At the same time, the rear end surfaces 44c, 43c of the right and left projecting portions 44, 43 reach rear end edges of the projecting-side end surfaces (the height regulating surfaces) 57a, 56a of the right and left ribs 57, 56, respectively.

It is set in advance that a given gap is created between an outer periphery of the lens cover 42 and an inner periphery of the opening 53.

In this state, the lower surface of the frame 41 of the camera 4 on an opposite side of the lens cover 42 side is pushed towards the top wall portion 51 as shown by the arrow in FIG. 14C.

Thus, as shown in FIG. 10 and FIG. 11, the rear end surfaces 44c, 43c of the right and left projecting portions 44, 43 climb over the rear end edges of the projecting-side end surfaces (the height regulating surfaces) 57a, 56a of the right and left ribs 57, 56, respectively, and come into contact with the rear end surfaces 57c, 56c of the right and left ribs 57, 56, respectively. At the same time, the center line (see the dashed line in FIG. 11) of the camera 4 becomes parallel to the top wall portion 51, and, the outer peripheral region of the lens cover 42 on a front end surface of the frame 41 of the camera 4 comes into contact with the inner surface 52a of the suspended wall portion 52 of the upper column cover 5.

Thus, the camera 4 is positioned so as to be immobilized in the front-rear direction of the upper column cover 5. The position of the camera 4 that is positioned as described above is the final assembly position described earlier.

As described earlier, when the rear end surfaces 44c, 43c of the right and left projecting portions 44, 43 climb over the rear end edges of the projecting-side end surfaces (the height regulating surfaces) 57a, 56a of the right and left ribs 57, 56, respectively, and come into contact with the rear end surfaces 57c, 56c of the right and left ribs 57, 56, respectively, click sound is generated. Because of this, an operator is able to recognize the sound as adequate moderation feeling and is thus able to realize that the camera 4 is assembled correctly and surely.

Thereafter, the screws 7 are inserted into the screw insertion holes 41b of the mounting pieces 41a of the camera 4, respectively, and then screwed into the screw holes 55a, 54a of the right and left screw receiving portions 55, 54, respectively. Thus, the camera 4 is fixed to the upper column cover 5.

As described so far, when the camera 4 is assembled to the upper column cover 5, the camera 4 is simply arranged at the initial assembly position and then pushed to the final assembly position. Then, it becomes possible to fix the camera 4 in the state where the camera 4 is assembled at the final assembly position surely without interference between the lens cover 42 of the camera 4 and the upper column cover 5.

As evident from the foregoing description, in this embodiment, the right and left horizontal shake regulating surfaces 55b, 54b of the upper column cover 5 play a role of regulating right and left positions of the camera 4 with respect to the top wall portion 51 when the camera 4 is arranged at the initial assembly position, and a role of guiding the camera 4 so that the camera 4 moves linearly without having a horizontal shake in a process in which the camera 4 is moved from the initial assembly position to the final assembly position.

Further, the right and left separation regulating surfaces 55c, 54c of the upper column cover 5 play a role of regulating the separation position of the camera 4 from the suspended wall portion 52 when the camera 4 is arranged at the initial assembly position.

Further, together with the right and left projecting portions 44, 43 of the camera 4, the right and left ribs 57, 56 of the upper column cover 5 play a role of regulating the separation position (the height position) of the camera 4 from the top wall portion 51 when the camera 4 is arranged at the initial assembly position, and a role of guiding the camera 4 so that the camera 4 is moved linearly without a horizontal shake in the process in which the camera 4 is moved from the initial assembly position to the final assembly position.

Further, together with the inner surface 52a of the suspended wall portion 52 of the upper column cover 5, the rear end surfaces 57c, 56c of the ribs 57, 56 play a role of fixing the camera 4 at the final assembly position.

As described above, from the initial stage to a final stage through an intermediate stage of the assembly process described above, the lens cover 42 of the camera 4 no longer interferes with the top wall portion 51 and the suspended wall portion 52 of the upper column cover 5.

As described so far, according to the embodiment to which the present disclosure is applied, since the camera 4 is assembled to the inner side of the top wall portion 51 of the upper column cover 5, the cover for the camera like the one described in JP 2007-69680 JP is not necessary. Thus, the number of components can be reduced, and a raised amount of the upper part of the upper column cover 5 is restrained. This contributes to an improvement of visibility of meters (not shown).

Moreover, according to this embodiment, when the camera 4 is arranged at the initial assembly position, the lens cover 42 of the camera 4 is arranged so as to be separated from the top wall portion 51 and the suspended wall portion 52 of the upper column cover 5. Also, in the process in which the camera 4 arranged at the initial assembly position is moved to the final assembly position, a movement of the lens cover 42 of the camera 4 in the upward, downward, rightward, and leftward directions is regulated. Therefore, in the process in which the camera 4 is moved from the initial assembly position to the final assembly position, the lens cover 42 interferes with neither the top wall portion 51 nor the suspended wall portion 52 of the upper column cover 5.

Therefore, according to this embodiment, it is possible to assemble the camera 4 to the upper column cover 5 in a correct state with a relatively easy operation without damages of the lens (not shown) and the lens cover 42 of the camera 4.

An applicable embodiment of the present disclosure is not limited to the foregoing embodiment, and can be changed appropriately within the scope of claims and scopes equivalent to the scope of present disclosure.

(1) In the foregoing embodiment, described as an example is the form in which the horizontal shake regulating surfaces 55b, 54b and the separation regulating surfaces 55c, 54c of the right and left screw receiving portions 55, 54 are orthogonal to each other, respectively, thereby forming the depressions, respectively. Meanwhile, the right and left outer side surfaces 41d, 41c and the rear end surface 41e of the frame 41 of the camera 4 are orthogonal to each other, respectively, thereby forming the corner portions, respectively. However, an applicable embodiment of the present disclosure is not limited to this.

For example, although not illustrated, as opposed to the foregoing, the horizontal shake regulating surfaces 55b, 54b and the separation regulating surfaces 55c, 54c of the right and left screw receiving portions 55, 54 may be made orthogonal to each other, thereby forming corner portions, respectively. Meanwhile, the right and left outer side surfaces 41d, 41c and the rear end surface 41e of the frame 41 may be made orthogonal to each other, thereby forming depressions, respectively. This form is also included in the present disclosure.

(2) In the foregoing embodiment, described as an example is the form in which the horizontal regions and the inclined regions are provided on the upward surfaces 44a, 43a of the right and left projecting portions 44, 43 provided in the frame 41 of the camera 4, respectively. However, an applicable embodiment of the present disclosure is not limited to this.

For example, although not illustrated, the upward surfaces 44a, 43a of the right and left projecting portions 44, 43 may have the horizontal regions only, or the inclined regions only, respectively. This form is also included in the present disclosure.

Embodiments of the present disclosure are favorably used as a camera mounting structure in which a camera that is used to monitor a driver of a vehicle is assembled to an inside of a steering column.

What is claimed is:

1. A camera mounting structure in which a camera for monitoring a driver of a vehicle is assembled to an inside of a steering column, the camera mounting structure comprising an upper column cover of the steering column including a top wall portion and a suspended wall portion that is provided on a rear side of the top wall portion in a front-rear direction of the upper column cover, wherein
the suspended wall portion is provided with an opening for exposing a lens of the camera to a side of a steering wheel,
the upper column cover is provided with a final positioning part, an initial positioning part, and a guide part,
the final positioning part is used to position the camera in a state where the camera is arranged at a final assembly position at which the lens is arranged in the opening,
the initial positioning part is used to position the camera in a state where the camera is arranged at an initial assembly position at which the lens is separated from the top wall portion and the suspended wall portion, and
the guide part is used to guide the camera in a process in which the camera is moved from the initial assembly position to the final assembly position while the guide part is regulating a movement of the lens in upward, downward, rightward, and leftward directions with respect to the upper column cover.

2. The camera mounting structure according to claim 1, wherein the initial positioning part includes a horizontal shake regulating surface, a separation regulating surface, and a height regulating surface, the horizontal shake regulating surface regulating a movement of the camera in a right-left direction of the upper column cover, the separation regulating surface regulating a movement of the camera in a front direction in the front-rear direction of the upper column cover, the height regulating surface regulating a separation position of the camera from an inner surface of the top wall portion.

3. The camera mounting structure according to claim 2, wherein:
a mounting piece is provided in the camera on an opposite side from the lens, the mounting piece being used for fixing the camera to the upper column cover in a state where the camera is arranged at the final assembly position;
a screw receiving portion is provided in the inner surface of the top wall portion, the screw receiving portion being used for fastening the mounting piece with a screw;
the horizontal shake regulating surface is made from a flat surface that is provided in the screw receiving portion along the front-rear direction of the upper column cover and also receives an outer side surface of the camera on the opposite side from the lens, the outer side surface of the camera being provided along the front-rear direction of the upper column cover; and
the separation regulating surface is made from a flat surface that is provided in the screw receiving portion along the right-left direction of the upper column cover and also receives a rear end surface of the camera on the opposite side from the lens, the rear end surface of the camera being provided along the right-left direction of the upper column cover.

4. The camera mounting structure according to claim 2, wherein:
- ribs are provided in the top wall portion and project downwardly in an upward-downward direction of the upper column cover, the ribs being provided at positions, respectively, that are separated from the suspended wall portion and located on outer sides of a first end side of the opening and a second end side of the opening, respectively;
- the first end side of the opening is on a right side in the right-left direction of the upper column cover, and the second end side of the opening is on a left side in the right-left direction of the upper column cover;
- projecting portions projecting outwardly are provided on a right side and a left side of the camera, respectively;
- the right side and the left side of the camera are on the right side in the right-left direction of the upper column cover and the left side in the right-left direction of the upper column cover, respectively; and
- projecting-side end surfaces of the ribs serve as height regulating surfaces that regulate a separation position of the camera from an inner surface of the top wall portion as given portions of the projecting portions are brought into contact with the projecting-side end surfaces of the ribs when the camera is arranged at the initial assembly position.

5. The camera mounting structure according to claim 4, wherein the projecting-side end surfaces of the ribs also serve as guide surfaces together with right and left projecting portions of the camera that come into contact with the projecting-side end surfaces of the ribs, respectively, the guide surfaces guiding the camera when the camera is moved from the initial assembly position to the final assembly position while regulating a movement of the camera to the right and the left.

6. The camera mounting structure according to claim 1, wherein:
- a lens cover is provided on an outer side of the lens of the camera so as to cover the lens; and
- the lens cover is fitted into the opening in a non-contact state when the camera is arranged at the final assembly position.

* * * * *